United States Patent
Lee et al.

(10) Patent No.: US 9,063,787 B2
(45) Date of Patent: Jun. 23, 2015

(54) SYSTEM AND METHOD FOR USING CLUSTER LEVEL QUORUM TO PREVENT SPLIT BRAIN SCENARIO IN A DATA GRID CLUSTER

(75) Inventors: Robert H. Lee, San Carlos, CA (US);
Mark Falco, Burlington, MA (US);
Gene Gleyzer, Lexington, MA (US);
Cameron Purdy, Lexington, MA (US)

(73) Assignee: ORACLE INTERNATIONAL CORPORATION, Redwood Shores, CA (US)

(\*) Notice: Subject to any disclaimer, the term of this patent is extended or adjusted under 35 U.S.C. 154(b) by 425 days.

(21) Appl. No.: 13/352,203

(22) Filed: Jan. 17, 2012

(65) Prior Publication Data

US 2012/0197822 A1    Aug. 2, 2012

Related U.S. Application Data

(60) Provisional application No. 61/437,546, filed on Jan. 28, 2011.

(51) Int. Cl.
*G06F 9/50* (2006.01)
*G06F 11/14* (2006.01)

(52) U.S. Cl.
CPC ........ *G06F 9/5061* (2013.01); *G06F 2209/505* (2013.01); *G06F 11/1425* (2013.01)
USPC .......................................................... 706/10

(58) Field of Classification Search
CPC ............ G06E 3/00; G06F 15/00; G06G 7/00; G06N 5/04; G06N 5/043; G06N 99/005
USPC .................................................... 706/10, 62
See application file for complete search history.

(56) References Cited

U.S. PATENT DOCUMENTS

| | | | |
|---|---|---|---|
| 5,784,569 | A | 7/1998 | Miller et al. |
| 5,819,272 | A | 10/1998 | Benson |
| 5,940,367 | A | 8/1999 | Antonov |
| 5,991,894 | A | 11/1999 | Lee et al. |
| 5,999,712 | A | 12/1999 | Moiin et al. |
| 6,182,139 | B1 | 1/2001 | Brendel |
| 6,377,993 | B1 | 4/2002 | Brandt et al. |
| 6,487,622 | B1 | 11/2002 | Coskrey, IV et al. |
| 6,490,620 | B1 | 12/2002 | Ditmer et al. |
| 6,615,258 | B1 | 9/2003 | Barry et al. |
| 6,631,402 | B1 | 10/2003 | Devine et al. |
| 6,693,874 | B1 | 2/2004 | Shaffer et al. |
| 6,714,979 | B1 | 3/2004 | Brandt et al. |
| 6,968,571 | B2 | 11/2005 | Devine et al. |
| 7,114,083 | B2 | 9/2006 | Devine et al. |

(Continued)

*Primary Examiner* — Jeffrey A Gaffin
*Assistant Examiner* — Ilya Traktovenko
(74) *Attorney, Agent, or Firm* — Tucker Ellis LLP

(57) ABSTRACT

A system and method is described for use with a data grid cluster, which uses cluster quorum to prevent split brain scenario. The data grid cluster includes a plurality of cluster nodes, each of which runs a cluster service. Each cluster service collects and maintains statistics regarding communication flow between its cluster node and the other cluster nodes in the data grid cluster. The statistics are used to determine a status associated with other cluster nodes in the data grid cluster whenever a disconnect event happens. The data grid cluster is associated with a quorum policy, which is defined in a cache configuration file, and which specifies a time period that a cluster node will wait before making a decision on whether or not to evict one or more cluster nodes from the data grid cluster.

20 Claims, 8 Drawing Sheets

(56) References Cited

U.S. PATENT DOCUMENTS

| | | |
|---|---|---|
| 7,139,925 B2 | 11/2006 | Dinker et al. |
| 7,266,822 B1 | 9/2007 | Boudnik et al. |
| 7,328,237 B1 | 2/2008 | Thubert et al. |
| 7,376,953 B2 | 5/2008 | Togasaki |
| 7,543,046 B1 | 6/2009 | Bae et al. |
| 7,720,971 B2 | 5/2010 | Moutafov |
| 7,739,677 B1 | 6/2010 | Kekre et al. |
| 7,792,977 B1 | 9/2010 | Brower et al. |
| 7,814,248 B2 | 10/2010 | Fong et al. |
| 7,953,861 B2 | 5/2011 | Yardley |
| 8,195,835 B2 | 6/2012 | Ansari et al. |
| 8,209,307 B2 | 6/2012 | Erofeev |
| 8,312,439 B2 | 11/2012 | Kielstra et al. |
| 2002/0035559 A1 | 3/2002 | Crowe et al. |
| 2002/0073223 A1 | 6/2002 | Darnell et al. |
| 2002/0078312 A1 | 6/2002 | Wang-Knop et al. |
| 2003/0023898 A1 | 1/2003 | Jacobs et al. |
| 2003/0046286 A1 | 3/2003 | Jacobs et al. |
| 2003/0120715 A1 | 6/2003 | Johnson et al. |
| 2003/0187927 A1 | 10/2003 | Winchell |
| 2003/0191795 A1 | 10/2003 | Bernardin et al. |
| 2004/0059805 A1* | 3/2004 | Dinker et al. .......... 709/223 |
| 2004/0179471 A1 | 9/2004 | Mekkittikul et al. |
| 2004/0267897 A1 | 12/2004 | Hill et al. |
| 2005/0021737 A1 | 1/2005 | Ellison et al. |
| 2005/0083834 A1* | 4/2005 | Dunagan et al. .......... 370/221 |
| 2005/0097185 A1 | 5/2005 | Gibson et al. |
| 2005/0138460 A1 | 6/2005 | McCain |
| 2005/0193056 A1 | 9/2005 | Schaefer et al. |
| 2006/0095573 A1 | 5/2006 | Carle et al. |
| 2007/0016822 A1 | 1/2007 | Rao et al. |
| 2007/0118693 A1 | 5/2007 | Brannon et al. |
| 2007/0140110 A1 | 6/2007 | Kaler |
| 2007/0174160 A1 | 7/2007 | Solberg et al. |
| 2007/0237072 A1 | 10/2007 | Scholl |
| 2007/0260714 A1 | 11/2007 | Kalmuk et al. |
| 2007/0271584 A1 | 11/2007 | Anderson et al. |
| 2008/0183876 A1 | 7/2008 | Duvur et al. |
| 2008/0276231 A1 | 11/2008 | Huang et al. |
| 2008/0281959 A1* | 11/2008 | Robertson .......... 709/224 |
| 2009/0265449 A1* | 10/2009 | Krishnappa et al. .......... 709/220 |
| 2009/0320005 A1 | 12/2009 | Toub et al. |
| 2010/0128732 A1 | 5/2010 | Jiang |
| 2010/0211931 A1 | 8/2010 | Levanoni et al. |
| 2010/0312861 A1 | 12/2010 | Kolhi et al. |
| 2011/0041006 A1 | 2/2011 | Fowler |
| 2011/0107135 A1* | 5/2011 | Andrews et al. .......... 714/2 |
| 2011/0161289 A1 | 6/2011 | Pei et al. |
| 2011/0179231 A1* | 7/2011 | Roush .......... 711/152 |
| 2011/0249552 A1 | 10/2011 | Stokes et al. |
| 2012/0117157 A1 | 5/2012 | Ristock |
| 2012/0158650 A1 | 6/2012 | Andre et al. |
| 2012/0215740 A1 | 8/2012 | Vaillant et al. |

* cited by examiner

SYSTEM AND METHOD FOR USING CLUSTER LEVEL QUORUM TO PREVENT SPLIT BRAIN SCENARIO IN A DATA GRID CLUSTER

CLAIM OF PRIORITY

This application claims the benefit of priority to U.S. Provisional Patent Application No. 61/437,546, titled "QUORUM IN A DISTRIBUTED DATA GRID", filed Jan. 28, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer cluster environments, and data and resource management in such environments, and is particularly related to a system and method for using cluster level quorum to prevent split brain scenario in a data grid cluster.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

In order to meet these requirements, a distributed data management and cache service can be run in the application tier so as to run in-process with the application itself, e.g., as part of an application server cluster. However, a loss of connectivity can occur rather frequently in the application server cluster, which can result in a split-brain scenario. There is a need to maintain the functionality of the distributed data management and cache service when such an event happens. This is the general area that embodiments of the invention are intended to address.

SUMMARY

In accordance with an embodiment, a system and method is described for use with a data grid cluster, which uses cluster quorum to prevent split brain scenario. The data grid cluster includes a plurality of cluster nodes, each of which runs a cluster service. Each cluster service collects and maintains statistics regarding communication flow between its cluster node and the other cluster nodes in the data grid cluster. The statistics are used to determine a status associated with other cluster nodes in the data grid cluster whenever a disconnect event happens. The data grid cluster is associated with a quorum policy, which is defined in a cache configuration file, and which specifies a time period that a cluster node will wait before making a decision on whether or not to evict one or more cluster nodes from the data grid cluster.

DETAILED DESCRIPTION

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol, with no single points of failure, and can automatically and transparently fail over and redistribute its clustered data management services whenever a server becomes inoperative or disconnected from the network.

Data Grid Cluster Services

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
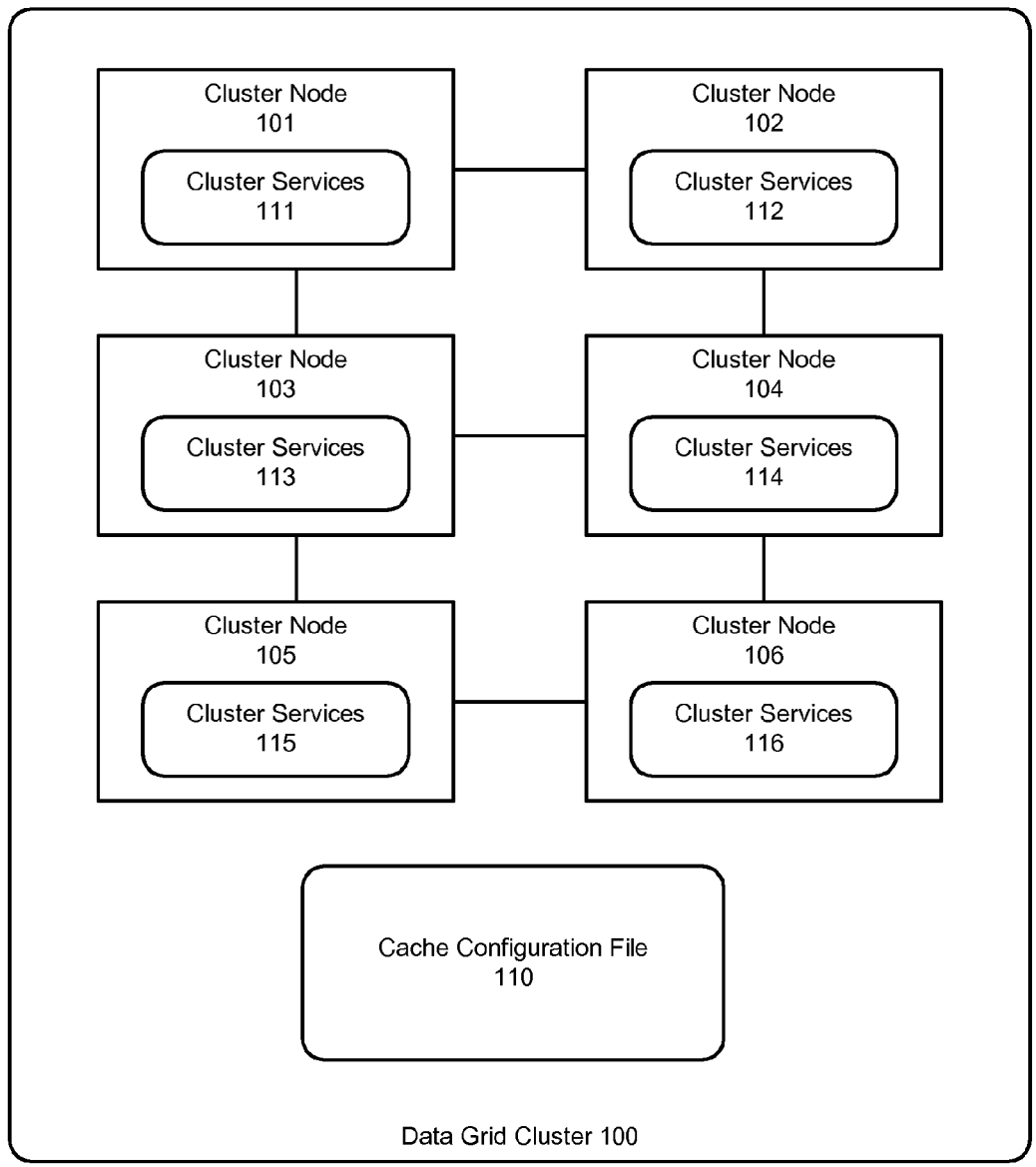
FIG. 1 is an illustration of a data grid cluster, in accordance with various embodiments.

FIG. 1 is an illustration of a data grid cluster in accordance with various embodiments of the invention. As shown in FIG. 1, a data grid cluster 100 includes a plurality of cluster nodes 101-106 having various cluster services 111-116 running thereon. Additionally, a cache configuration file 110 can be used to configure the data grid cluster.

In accordance with various embodiments, servers that store data within the data grid cluster can support a set of quorum features. The quorum features can be used to make decisions on physical resource planning (e.g. server, RAM memory, etc), and to determine how the data grid cluster behaves in the absence of such physical resources. As referred to herein, a quorum refers to the minimum number of service members in a cluster that is required before a particular service action is allowed or disallowed. By way of illustration, during deployment, the physical resources of the data grid cluster can be selected according to a plan that is based on the amount of data and requests that will be processed by the grid. For example, a data grid cluster can have 10 servers with totally 10 gigabytes of random access memory (RAM) for handling the grid computing. However, in the event that a subset of those servers and/or RAM fail, it may be important to implement a system to manage how the data grid cluster will behave in their absence. In accordance with an embodiment, the quorum feature enables the data grid cluster to manage the cluster processing in the event of losing some of those resources.

In accordance with an embodiment, the quorum features can enable the configuring of the data grid cluster at the cluster level. The system can use the cluster quorum policy to specify a time period that a data grid cluster defers to make a decision on whether or not to evict one or more cluster nodes in question after a disconnection happens. Such a cluster quorum can prevent a split brain scenario in a data grid cluster with a plurality of cluster nodes when a disconnection event happens.

Cluster Quorum

In accordance with one embodiment, a cluster quorum can enable management of cluster/machine network membership. For example, the quorum can be used to control the ability of a machine to join and become a member of the cluster, or to get evicted from the cluster. In accordance with an embodiment, quorum policies can also control what happens when members connect to the cluster, and also when members leave the cluster.

Figure 2:
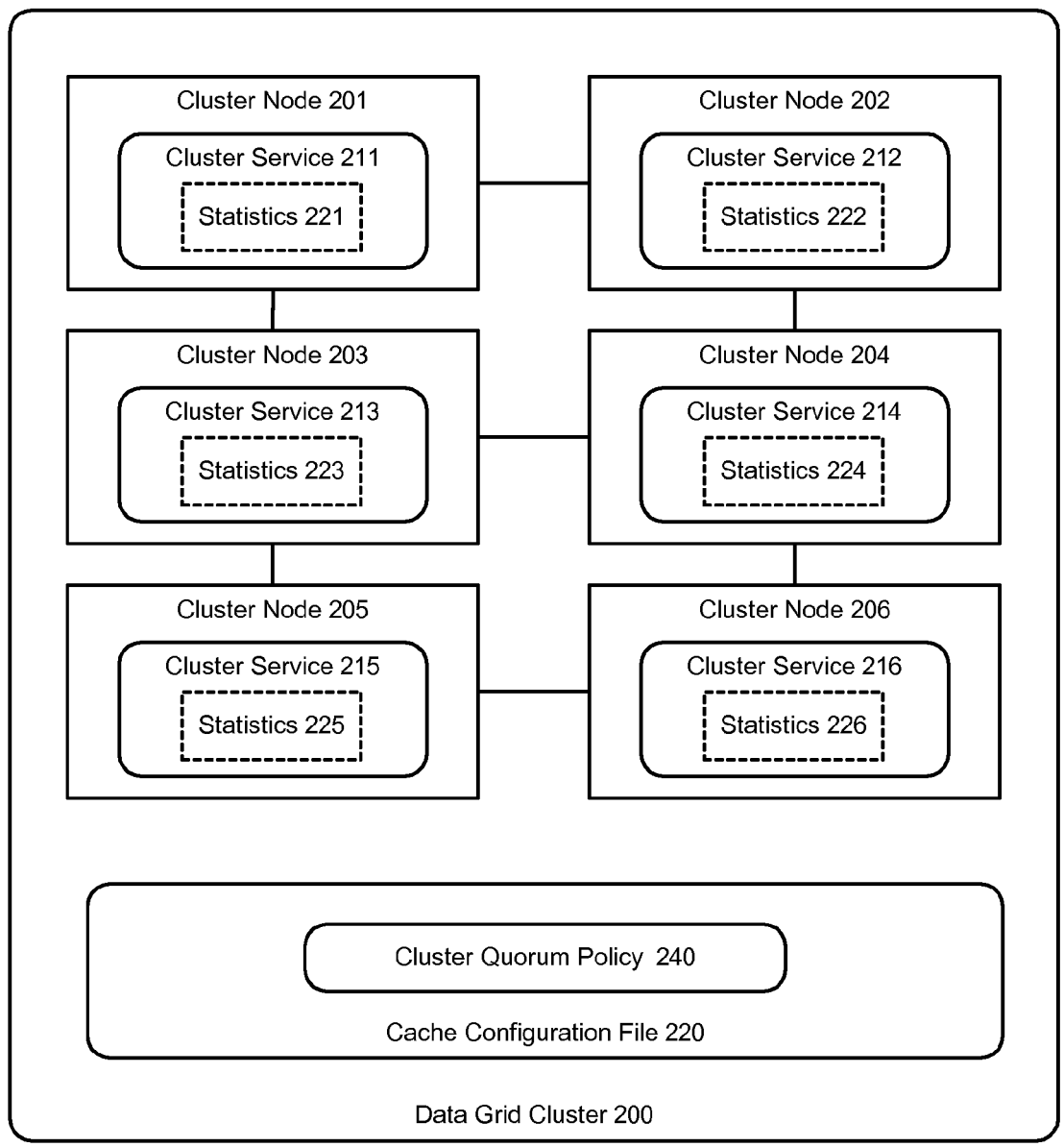
FIG. 2 is an illustration of a data grid cluster that supports cluster quorum features, in accordance with various embodiments.

FIG. 2 is an illustration of a data grid cluster that supports cluster quorum features in accordance with various embodiments. As shown in FIG. 2, a data grid cluster 200 includes a plurality of cluster nodes 201-206. Each cluster node in the data grid cluster can have a cluster service 211-216 running on top of it. Each cluster service can be a root cluster service running on top of a cluster node collects and maintains statistics 221-226 regarding communication flow between the cluster node and other cluster nodes in the data grid cluster.

A root cluster service is automatically started when a cluster node joins a cluster, and typically there is exactly one root cluster service running on each cluster node. The root cluster service keeps track of the membership and services in the cluster. For example, the root cluster service is responsible for detecting other cluster nodes, monitoring the failure or death of other cluster nodes, and can be responsible for registering the availability of other services in the cluster. In one embodiment, a cluster node is considered a suspect cluster member when it has not responded to network communications, and is in imminent danger of being disconnected from the cluster.

As shown in FIG. 2, a quorum policy 240 can be specified in a cache configuration file 220 associated with the data grid cluster. The quorum policy can be stored in one or more cluster nodes in the data grid. The cluster quorum can be specified generically across all members, or constrained to members that have a specific role in the cluster, such as client or server members. In one embodiment, a <role-name> element in "member-identity" section of a cache configuration file can be used to define role names for cluster members.

One exemplary cluster quorum defines a timeout survivor quorum threshold that can be configured in an operational override file using the <timeout-survivor-quorum> element and optionally the role attribute. This element can be used within a <cluster-quorum-policy> element. Listing 1 illustrates configuring the timeout survivor quorum threshold to ensure that five cluster members with the server role are always kept in the cluster while removing suspect members, in accordance with an embodiment.

Listing 1

```
<cluster-config>
    <member-identity>
        <role-name>server</role-name>
    </member-identity>
    <cluster-quorum-policy>
        <timeout-survivor-quorum
        role="Server">5</timeout-survivor-quorum>
    </cluster-quorum-policy>
</cluster-config>
```

Preventing "Split Brain" Scenario

In accordance with an embodiment, a data grid cluster can have a large number of interconnected cluster nodes. The system can take into consideration that disconnection events can happen routinely within the data grid cluster, and are not necessarily rare and abnormal events. For example, an intermittent network outage can cause a large number of cluster members to be removed from the cluster.

Figure 3:
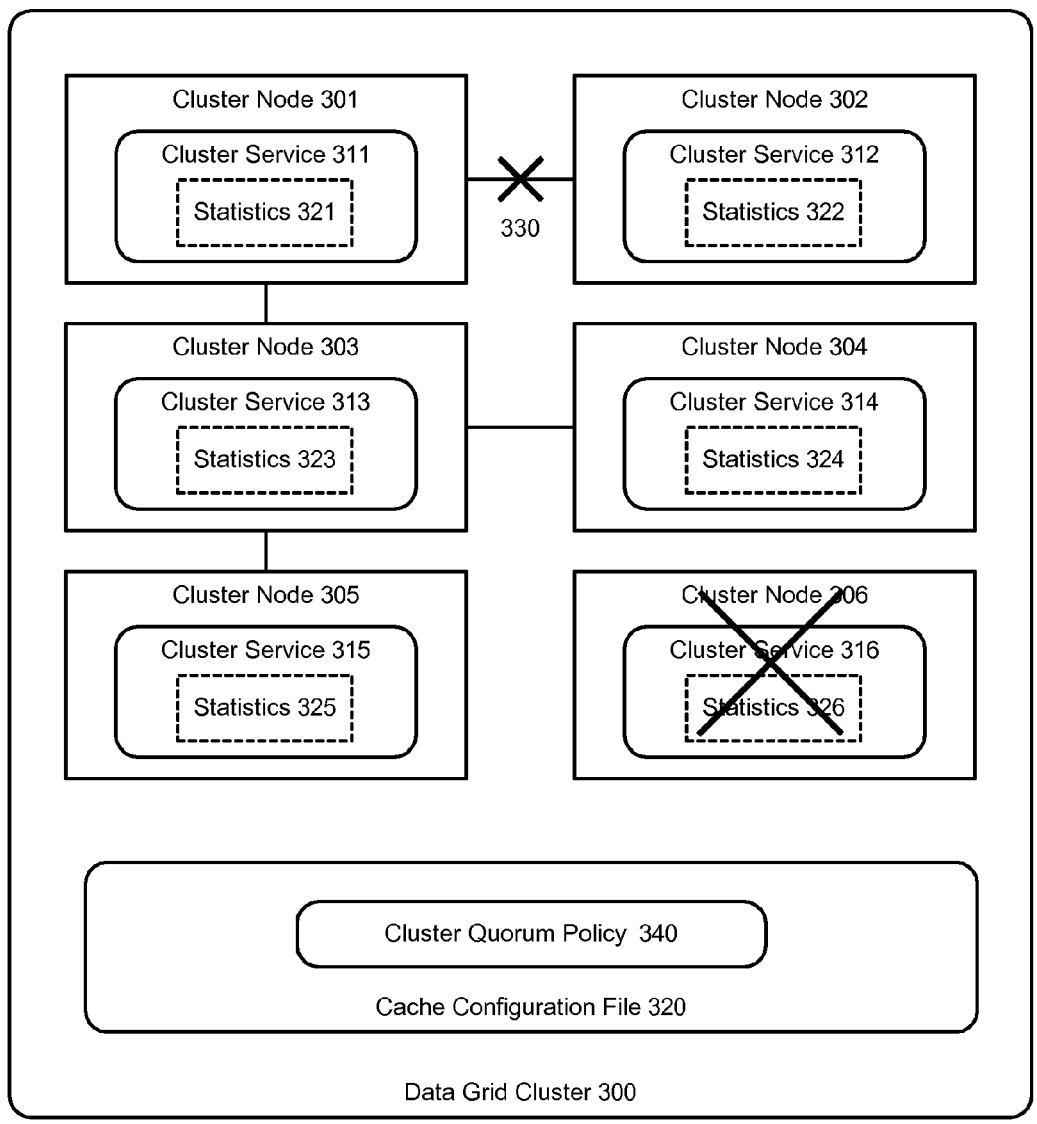
FIG. 3 is an illustration of a data grid cluster experiencing a disconnection event, in accordance with an embodiment.

FIG. 3 is an illustration of a data grid cluster experiencing a disconnection event. As shown in FIG. 3, a disconnection event 330 can happen in a data grid cluster 300 and cause a communication link between a cluster node 301 and a cluster node 302 to be disconnected. Additionally, as illustrated in FIG. 3 a cluster node 306 has shut down and an exit message has been broadcasted in the cluster. Furthermore, a cluster quorum policy 340 can be specified in a cache configuration file 320 that is associated with the data grid cluster.

In accordance with one embodiment, the system can determine a status associated with each cluster node in the data grid cluster when the disconnect event happens, based on the statistics 321-326 maintained on each cluster node. There are generally different types of cluster nodes in the data grid cluster: a first set of nodes that are definitely dead; a second set of nodes that are definitely alive; and a third set of nodes that are in question or that no deterministic answer can be currently given.

In the example illustrated in FIG. 3, the system can be sure that the cluster node 306 is definitely dead because it has explicitly departed the cluster by broadcasting an exit message to the nodes in the cluster. Furthermore, since cluster nodes 301, 303-305 remain interconnected and the root cluster service on each of these cluster nodes is certain that the other cluster nodes are still alive. However, it is not deterministic whether the cluster node 302 is still alive or already dead, since no communication can reach that node.

In accordance with one embodiment, a split brain scenario can happen in a data grid cluster when the data grid cluster makes a quick decision to evict the cluster nodes that are in question after a disconnection event strikes.

Figure 4:
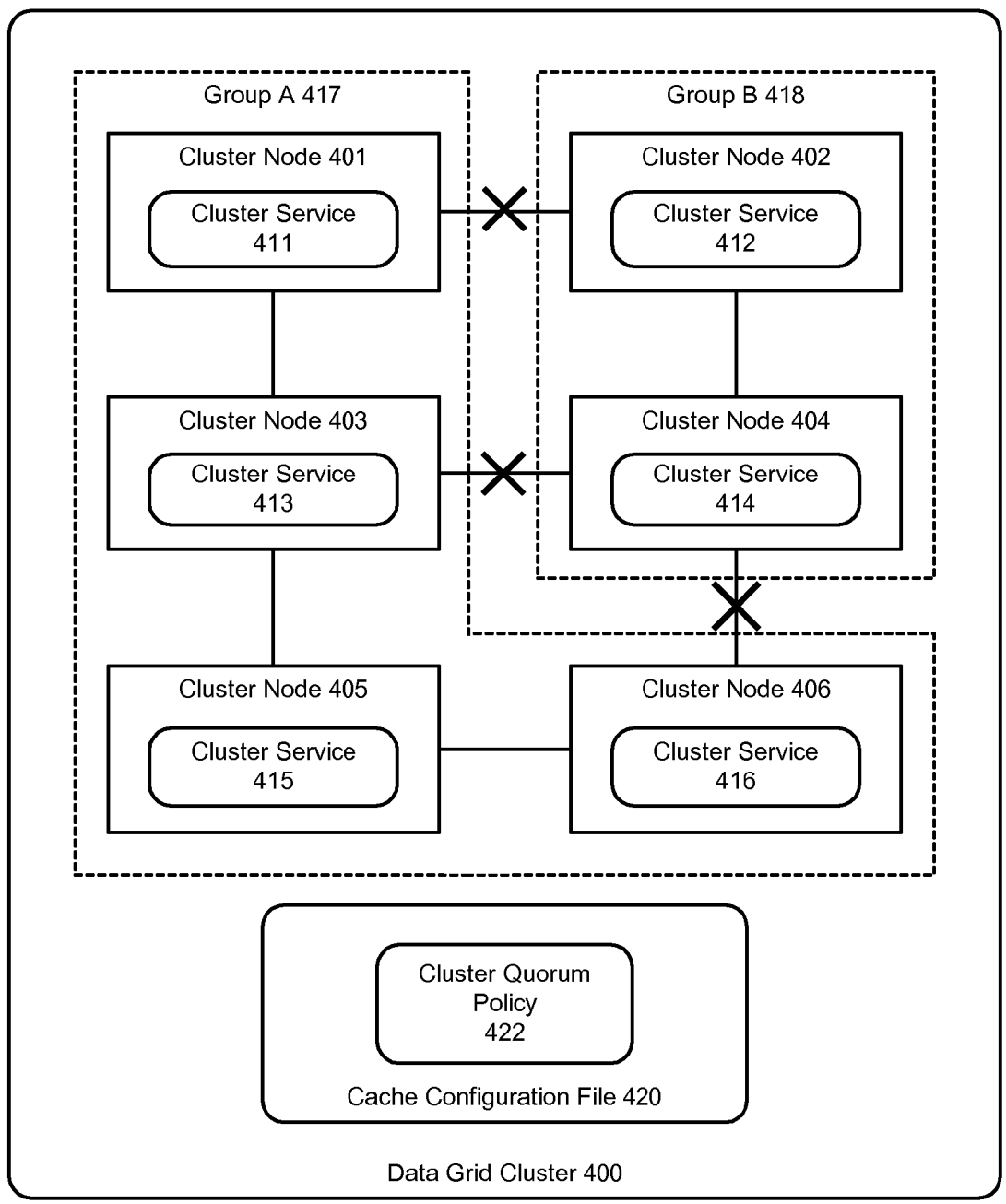
FIG. 4 is an illustration of a data grid cluster experiencing a split brain scenario, in accordance with an embodiment.

FIG. 4 is an illustration of a data grid cluster experiencing a split brain scenario. As shown in FIG. 4, a disconnection event happens in a data grid cluster 400, and causes the cluster nodes 402 and 404 to be disconnected from the rest of the cluster nodes 401, 403, 405 and 406 in the cluster. Effectively, the data grid cluster is now split into two separate groups: Group A 417 and Group B 418. On one hand, the cluster nodes in group A can not be deterministic whether all cluster nodes in Group B are alive. On the other hand, the cluster nodes in group B can not be deterministic whether the cluster nodes in Group A are alive.

In the example as shown in FIG. 4, each group can make a quick decision to evict the cluster nodes that are in question and form a separate cluster. As a result, a split brain scenario forms in the data grid cluster, and the two separate clusters will compete for the same resource when the connection between Group A and Group B are later restored. The split brain scenario is unfavorable for a data grid system, since it creates a race condition and complicates the resource management and service providing.

In accordance with various embodiments, the system can use cluster quorum strategies to prevent the split brain scenario in a data grid. One exemplary quorum strategy allows the data grid cluster to wait before making a decision on whether or not to evict one or more nodes in the data grid cluster, based on the assumptions that temporary disconnection events can be resolved in short time period. For example, an unintentional unplugged power cable for a network switch can be plugged back as soon as it is detected. In accordance with various embodiments, the cluster quorum policy can specify the time period for how long the cluster will defer making a decision on whether or not to evict one or more cluster nodes in the data grid cluster.

In accordance with various embodiments, in order to prevent the split brain scenario, a cluster quorum policy can specify that human intervention from an administrator is required, when there are less than a minimum number of nodes alive in the cluster, or when there are more than a maximum number of nodes in question existing in the cluster.

In accordance with one embodiment, referring to the illustration of FIG. 4, the connections between Group A and Group B can be reestablished during a time period as specified in the cluster quorum policy. Then, the data grid cluster can recover from the disconnection event without a need to evict one or more cluster nodes in the data grid cluster, and be able to provide services to the users.

Figure 5:
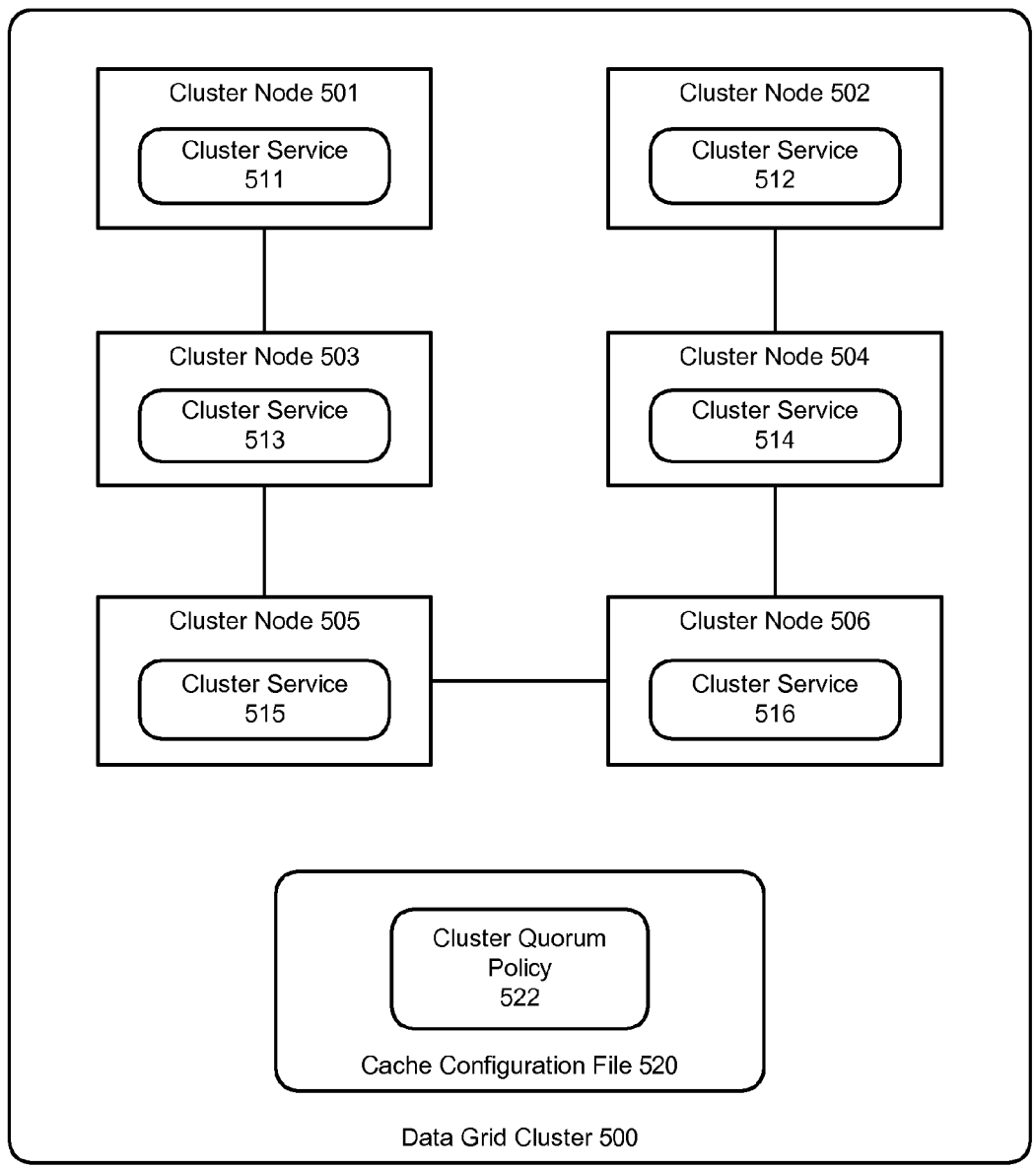
FIG. 5 is an illustration of a data grid cluster recovered from a split brain scenario using cluster quorum by reconnecting to the disconnected cluster nodes, in accordance with various embodiments.

FIG. 5 is an illustration of a data grid cluster recovered from a split brain scenario using cluster quorum by reconnecting to the disconnected cluster nodes, in accordance with various embodiments of the invention. As shown in FIG. 5, the disconnection event as shown in FIG. 4 has been resolved, and the connection has been reestablished at least partially between the cluster nodes 504 and 505 (which correspond respectively to the cluster nodes 404 and 405 as shown in FIG. 4). Since no eviction decision was made during the disconnection, using the quorum strategy, the functioning of the data grid cluster can restore functioning and no split brain scenario will happen in the data grid cluster.

In accordance with one embodiment, there is still a possibility that the disconnection event cannot be resolved during the time period specified in the cluster quorum policy. The data grid cluster can now evict part of the cluster that was disconnected based on pre-configured or user supplied policies. Also, the data grid cluster can make a decision to evict part of the cluster if there are conflicts among the cluster nodes that are reconnected.

Figure 6:
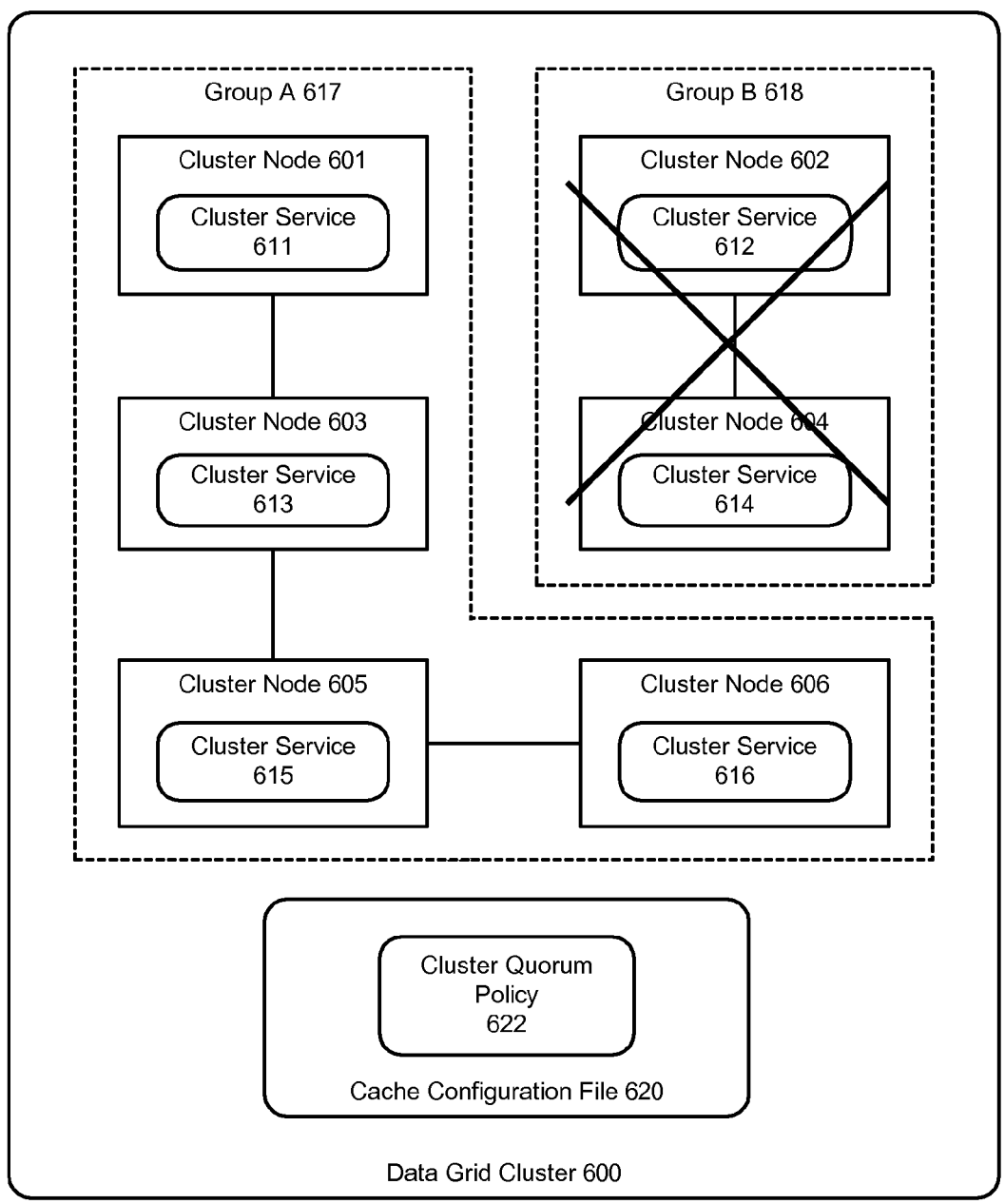
FIG. 6 is an illustration of a data grid cluster recovered from a split brain scenario using cluster quorum by evicting disconnected cluster nodes, in accordance with various embodiments.

FIG. 6 is an illustration of a data grid cluster recovered from a split brain scenario using cluster quorum, by evicting disconnected cluster nodes, in accordance with various embodiments of the invention. As shown in FIG. 6, the disconnection event as shown in FIG. 4 can not be resolved, and a decision can be made to evict the disconnect cluster nodes in Group B that includes cluster nodes 602 and 604, using the cluster quorum policy 622.

Figure 7:
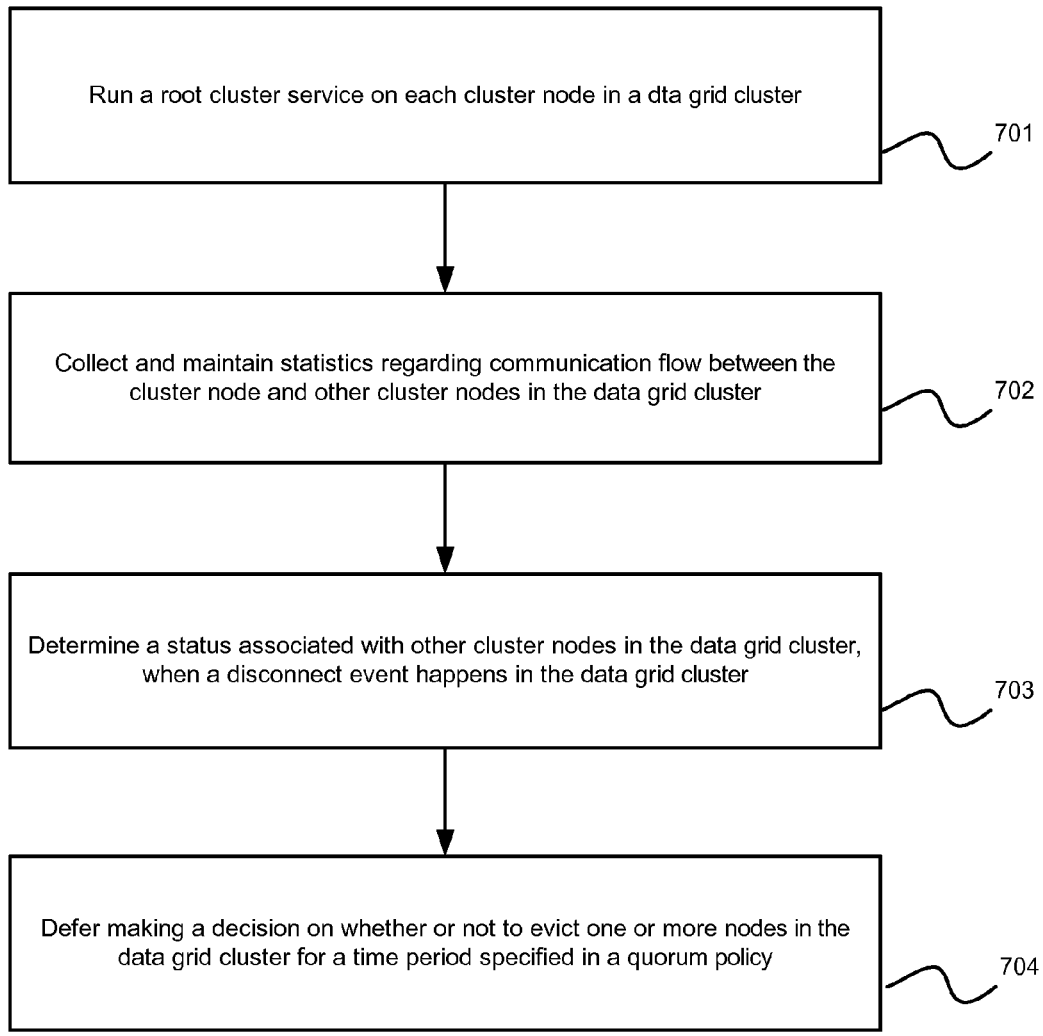
FIG. 7 illustrates an exemplary flow chart for using cluster quorum to prevent split brain scenario in a data grid cluster, in accordance with an embodiment.

FIG. 7 illustrates an exemplary flow chart for using cluster quorum to prevent split brain scenario in a data grid cluster in accordance with an embodiment. As shown in FIG. 7, at step 701, a cluster service, such as a root cluster service, can run on each cluster node in a data grid. At step 702, the root cluster service running on each cluster node is responsible for collecting and maintaining statistics regarding communication flow between the cluster node and other cluster nodes in the data grid cluster. At step 703, when a disconnect event happens in the data grid cluster, the data grid cluster can determine a status associated with each cluster node in the data grid cluster. The data grid cluster can defer to make a decision on whether or not to evict one or more nodes in the data grid cluster for a time period specified in a quorum policy, at step 704.

Enabling Custom Action Policies in the Cluster Quorum

In accordance with an embodiment, custom action policies can be used instead of the default quorum policies in order to incorporate user logics to support different cluster services in the data grid cluster system. The custom policies specified in user applications can incorporate arbitrary external states to provide fine grained resource-driven control of the services, since the user applications are in the best position to manage these external states.

Figure 8:
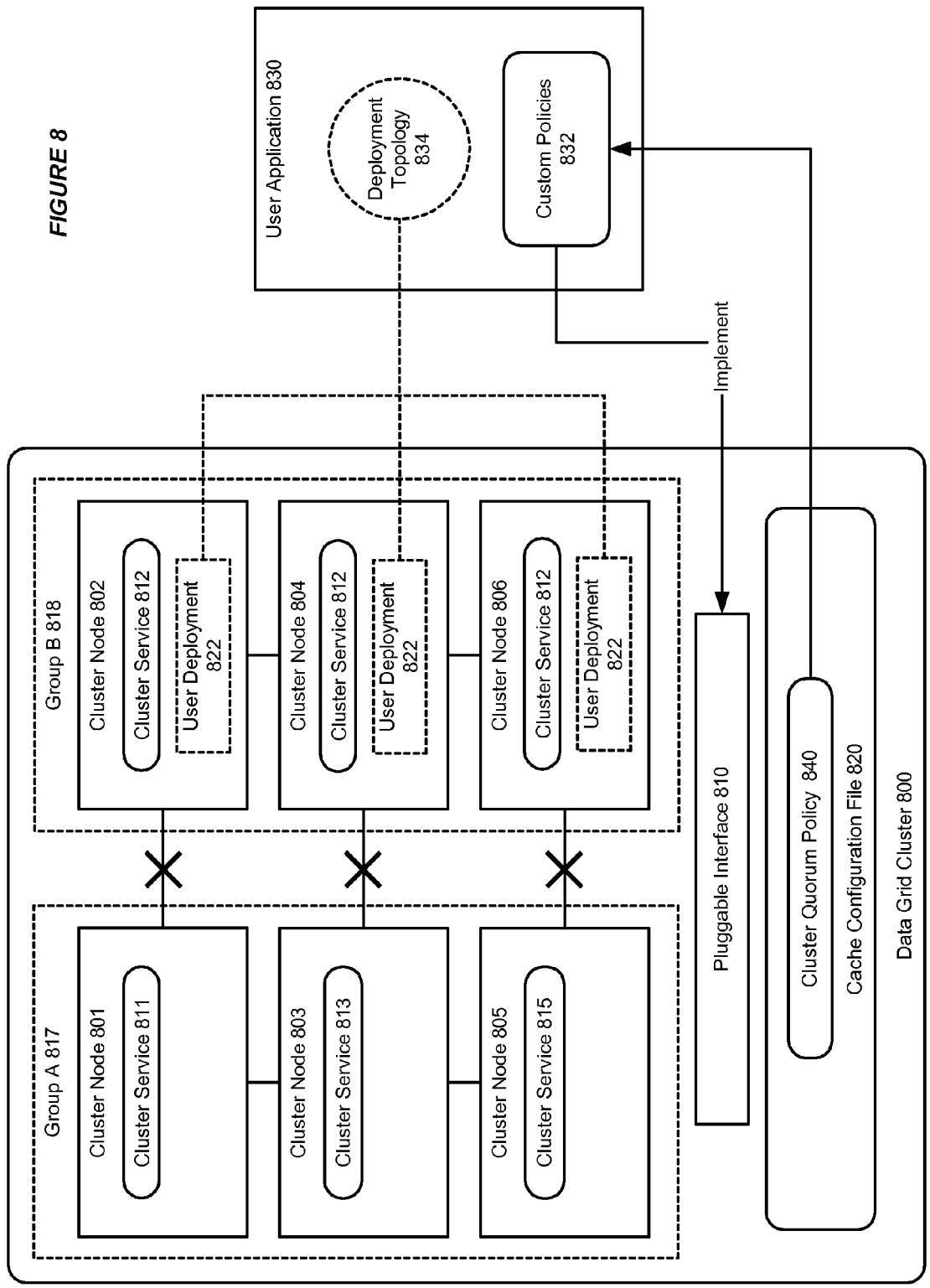
FIG. 8 illustrates an exemplary flow chart for supporting custom action policies in a data grid cluster, in accordance with an embodiment.

FIG. 8 is an illustration of a distributed data management system that supports custom action policies, in accordance with various embodiments of the invention. As shown in FIG. 8, a data grid cluster 800 includes a plurality of cluster nodes 801-806. The cluster quorum policy 840 defined in the cache management file 820 allows the data grid cluster to use custom policies 832 managed by user applications 830. In accordance with an embodiment, the custom policies in the user application 830 can implement a pluggable interface 810 supported by the data grid cluster. The pluggable interface allows the users to implement custom policies to control the behaviors and features of the of data grid cluster. One exemplary pluggable interface is a com.tangosol.net.ActionPolicy interface provided by Oracle Coherent data grid cluster. In accordance with an embodiment, the user application allows the custom policies to incorporate in different external states, such as deployment topology information 834 that describes user application deployment topology 822, 824, and 826 in the data grid cluster. Additionally, the custom policies can include other custom algorithms that allow user intervention based, e.g. on secondary communication and/or a dedicated link.

In the example shown in FIG. 8, a disconnection event splits the data grid cluster into two disconnected groups: Group A 817 (cluster nodes 801, 803, and 805) and Group B 818 (cluster nodes 802, 804, and 806). The data grid cluster needs to make a decision on which group of cluster nodes should be evicted. As shown in FIG. 8, Group B is more important to the user, since Group B contains the user application deployment. Thus, the data grid cluster can evict Group A and maintain Group B using custom policies based on the deployment topology information.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for using cluster quorum to prevent split brain scenario in a distributed data grid cluster, comprising:
    a data grid cluster comprising a plurality of cluster nodes wherein each cluster node comprises a microprocessor;
    a plurality of cluster services, wherein each cluster service runs on a particular cluster node of said plurality of cluster nodes in the data grid cluster and collects and maintains statistics regarding communication flow between the particular cluster node and other cluster nodes in the data grid cluster, and wherein the statistics are used by the data grid cluster to determine a status associated with each other cluster node in the data grid cluster when a disconnection event happens in the data grid cluster;
    a cluster quorum policy defined in a cache configuration file associated with the data grid cluster, wherein the cluster quorum policy specifies a minimum number of cluster nodes required to permit a decision whether to evict one or more cluster nodes from the data grid cluster, and a time period that the data grid cluster defers to make a decision on whether or not to evict one or more cluster nodes from the data grid cluster; and
    wherein, when one or more cluster nodes are detected to have been disconnected (disconnected nodes) from the data grid cluster as a results of a disconnection event,
        the data grid cluster defers to make a decision on whether or not to evict the disconnected nodes from the data grid cluster for the time period specified in the cluster quorum policy,
        if a connection is reestablished to the disconnected nodes prior to expiration of the time period specified in the cluster quorum policy, the data grid cluster does not evict the disconnected nodes; and
        if the connection is not reestablished to the disconnected nodes prior to expiration of the time period specified in the cluster quorum policy and a number of cluster nodes remaining in the cluster after excluding the disconnected nodes is equal to at least the minimum number of cluster nodes required to permit a decision whether to evict one or more cluster nodes from the data grid cluster, the data grid cluster does evict the disconnected nodes.

2. The system according to claim 1, wherein:
each cluster service is a root cluster service, and wherein there is exactly one root cluster service running on each cluster node in the data grid cluster.

3. The system according to claim 1, wherein:
the status associated with each other cluster node in the data grid cluster is one of
    a node that is definitely dead;
    a node that is definitely alive; and
    a node that is in question.

4. The system according to claim 1, wherein:
the data grid cluster automatically recovers from the disconnection event to provide services to users.

5. The system according to claim 1, wherein:
if the connection is not reestablished to the disconnected nodes prior to expiration of the time period specified in the cluster quorum policy and a number of cluster nodes remaining in the cluster after excluding the disconnected nodes is less than the minimum number of cluster nodes required to permit a decision whether to evict one or more cluster nodes from the data grid cluster, the cluster quorum policy can specify that user input is required to evict the disconnected nodes.

6. The system according to claim 1, further comprising:
the data grid cluster supports a pluggable interface that allows users to implement custom policies to configure the data grid cluster.

7. The system according to claim 6, wherein:
the cluster quorum policy defined in the cache management file can refer to and/or include in custom policies managed by a user application, wherein the custom policies in the user application can implement the pluggable interface supported by the data grid cluster.

8. The system according to claim 7, wherein:
the custom policies incorporate in one or more external states managed by the user application.

9. The system according to claim 8, wherein:
at least one external state is deployment topology information that describes user application deployment topology in the data grid cluster.

10. The system according to claim 1, wherein:
a cluster node in the data grid cluster is considered becoming a suspected cluster member when it has not responded to network communications and/or is in imminent danger of being disconnected from the cluster.

11. A method for using cluster level quorum in a data grid cluster comprising a plurality of cluster nodes, the method comprising:
running a cluster service on each cluster node of the plurality of clusters nodes in the data grid cluster;
collecting and maintaining, via the cluster service running on each particular cluster node, statistics regarding communication flow between the particular cluster node and other cluster nodes in the data grid cluster;
determining a status associated with each cluster node in the data grid cluster when a disconnection event happens;
providing a cluster quorum policy defined in a cache configuration file associated with the data grid cluster, wherein the cluster quorum policy specifies a minimum number of cluster nodes required to permit a decision whether to evict one or more cluster nodes from the data grid cluster, and a time period that the data grid cluster defers to make a decision on whether or not to evict one or more cluster nodes from the data grid cluster; and
in response to detecting one or more cluster nodes to have been disconnected (disconnected nodes) from the data grid cluster as a results of a disconnection event,
deferring to make a decision for the time period specified in the cluster quorum policy on whether or not to evict the disconnected nodes from the data grid cluster based on the cluster quorum policy,
if a connection is reestablished to the disconnected nodes prior to expiration of the time period specified in the cluster quorum policy, determining not to evict the disconnected nodes; and
if the connection is not reestablished to the disconnected nodes prior to expiration of the time period specified in the cluster quorum policy and a number of cluster nodes remaining in the cluster after excluding the disconnected nodes is equal to at least the minimum number of cluster nodes required to permit a decision whether to evict one or more cluster nodes from the data grid cluster, the data grid cluster does evict the disconnected nodes.

12. The method of claim 11, further comprising:
running each cluster service as a root cluster service, wherein there is exactly one root cluster service running on each cluster node in the data grid cluster.

13. The method of claim 11, wherein the status associated with each other cluster node in the data grid cluster is one of:
a node that is definitely dead;
a node that is definitely alive; and
a node that is in question;
the data grid cluster automatically recovers from the disconnection event to provide services to users.

14. The method of claim 11, further comprising:
requiring user input to evict the disconnected nodes if the connection is not reestablished to the disconnected nodes prior to expiration of the time period specified in the cluster quorum policy and a number of cluster nodes remaining in the cluster after excluding the disconnected nodes is less than the minimum number of cluster nodes required to permit a decision whether to evict one or more cluster nodes from the data grid cluster.

15. The method of claim 11, further comprising:
providing a pluggable interface that allows users to implement custom policies to configure the data grid cluster.

16. The method of claim 11, further comprising:
providing a pluggable interface that allows users to implement a custom policy to configure the data grid cluster; and
referring to said custom policy from the cluster quorum policy.

17. The method of claim 11, further comprising:
providing a pluggable interface that allows users to implement a custom policy to configure the data grid cluster wherein the custom policy incorporates one or more external states managed by a user application; and
referring to said custom policy from the cluster quorum policy.

18. The method of claim 11, further comprising:
providing a pluggable interface that allows users to implement a custom policy to configure the data grid cluster wherein the custom policy incorporates deployment topology information that describes user application deployment topology in the data grid cluster; and
referring to said custom policy from the cluster quorum policy.

19. A non-transitory machine readable medium having instructions stored thereon for using cluster quorum to prevent split brain scenario in a distributed data grid cluster comprising a plurality of cluster nodes, which instructions, when executed by a system, cause the system to perform steps comprising:
running a cluster service on each cluster node of the plurality of clusters nodes in the data grid cluster;
collecting and maintaining, via the cluster service running on each particular cluster node, statistics regarding communication flow between the particular cluster node and other cluster nodes in the data grid cluster;
determining a status associated with each cluster node in the data grid cluster when a disconnection event happens;
providing a cluster quorum policy defined in a cache configuration file associated with the data grid cluster, wherein the cluster quorum policy specifies a minimum number of cluster nodes required to permit a decision whether to evict one or more cluster nodes from the data grid cluster, and a time period that the data grid cluster defers to make a decision on whether or not to evict one or more cluster nodes from the data grid cluster; and
in response to detecting one or more cluster nodes to have been disconnected (disconnected nodes) from the data grid cluster as a results of a disconnection event,
deferring to make a decision for the time period specified in the cluster quorum policy on whether or not to evict the disconnected nodes from the data grid cluster based on the cluster quorum policy,
if a connection is reestablished to the disconnected nodes prior to expiration of the time period specified in the cluster quorum policy, determining not to evict the disconnected nodes; and
if the connection is not reestablished to the disconnected nodes prior to expiration of the time period specified in the cluster quorum policy and a number of cluster nodes remaining in the cluster after excluding the disconnected nodes is equal to at least the minimum number of cluster nodes required to permit a decision whether to evict one or more cluster nodes from the data grid cluster, the data grid cluster does evict the disconnected nodes.

20. The non-transitory machine readable medium of claim 19, having further instructions stored thereon for using cluster quorum to prevent split brain scenario in a distributed data grid cluster comprising a plurality of cluster nodes, which further instructions, when executed by a system, cause the system to perform steps comprising:

requiring user input to evict the disconnected nodes if the connection is not reestablished to the disconnected nodes prior to expiration of the time period specified in the cluster quorum policy and a number of cluster nodes remaining in the cluster after excluding the disconnected nodes is less than the minimum number of cluster nodes required to permit a decision whether to evict one or more cluster nodes from the data grid cluster.

* * * * *

UNITED STATES PATENT AND TRADEMARK OFFICE
CERTIFICATE OF CORRECTION

PATENT NO. : 9,063,787 B2  
APPLICATION NO. : 13/352203  
DATED : June 23, 2015  
INVENTOR(S) : Lee et al.

Page 1 of 1

It is certified that error appears in the above-identified patent and that said Letters Patent is hereby corrected as shown below:

In the drawings

On sheet 7 of 8, in figure 7, under Reference Numeral 701, line 1, delete "dta" and insert -- data --, therefor.

In the specification

In column 6, line 49, before "data" delete "of".

Signed and Sealed this  
Eighth Day of March, 2016

Michelle K. Lee  
*Director of the United States Patent and Trademark Office*